4 Sheets—Sheet 1.

J. GATES.

Steam or Hydraulic Steering Apparatus.

No. 9,200. Reissued May 18, 1880.

WITNESSES:
T. S. West
Cornelius Cox

INVENTOR:
JOHN GATES,
BY H. W. Beadle & Co.
ATTYS.

J. GATES.

Steam or Hydraulic Steering Apparatus.

No. 9,200. Reissued May 18, 1880.

WITNESSES:
T. S. West
Cornelius Cox

INVENTOR:
JOHN GATES,
BY H. W. Beadle & Co
ATTYS

J. GATES.

Steam or Hydraulic Steering Apparatus.

No. 9,200. Reissued May 18, 1880.

WITNESSES:
T. S. West,
Cornelius Cox

INVENTOR:
JOHN GATES,
BY H. W. Beadle & Co.
ATTYS

J. GATES.
Steam or Hydraulic Steering Apparatus.
No. 9,200. Reissued May 18, 1880.
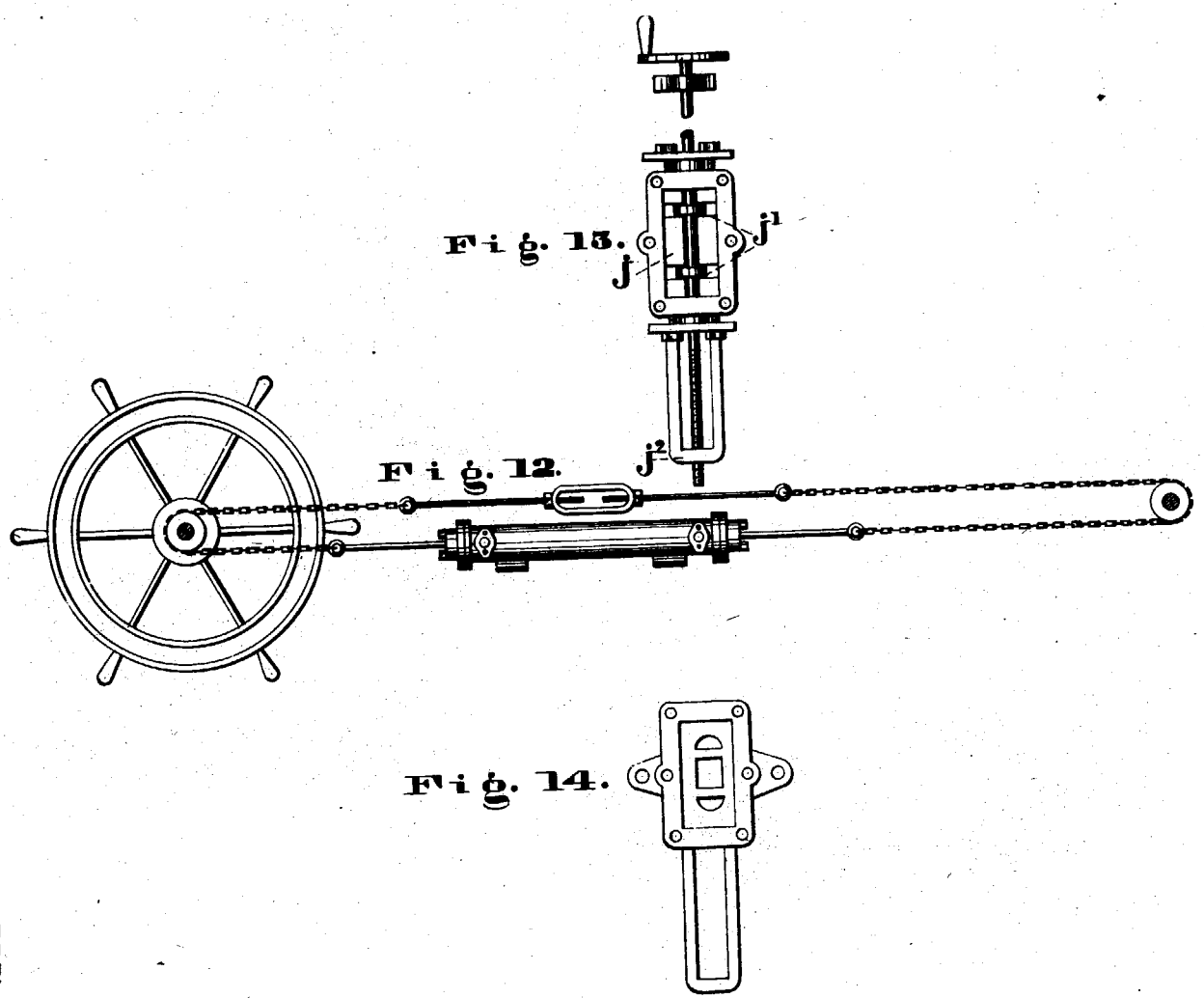
WITNESSES:
T. S. West
Cornelius Cox
INVENTOR:
JOHN GATES
BY H. W. Beadle & Co.
ATTYS

UNITED STATES PATENT OFFICE.

JOHN GATES, OF PORTLAND, OREGON.

STEAM OR HYDRAULIC STEERING APPARATUS.

SPECIFICATION forming part of Reissued Letters Patent No. 9,200, dated May 18, 1880.

Original No. 208,231, dated September 24, 1878. Application for reissue filed February 4, 1880.

*To all whom it may concern:*

Be it known that I, JOHN GATES, of Portland, in the county of Multnomah, in the State of Oregon, have invented new and useful Improvements in Steam or Hydraulic Steering Apparatus; and I do hereby declare the following to be a full, clear, and exact description of the same, reference being had to the accompanying drawings, and to the letters of reference marked thereon.

This invention consists, mainly, first, in the combination, with a rope, chain, or other line of connection uniting the steering-wheel to the rudder, of a cylinder-piston located on the line and forming a part of the same, the construction being such that either the steering-wheel or the piston may be actuated independently to move the rudder without the change of any part; and, second, in the combination, with a rope, chain, or other line of connection uniting the steering-wheel to the rudder, of a cylinder having a piston which is so far independent of the line of connection as to permit the latter to render through it without actuating it when the steering-wheel is used to move the rudder.

It consists, further, in certain details of construction, which, in connection with the foregoing, will be fully described hereinafter.

Figure 1:
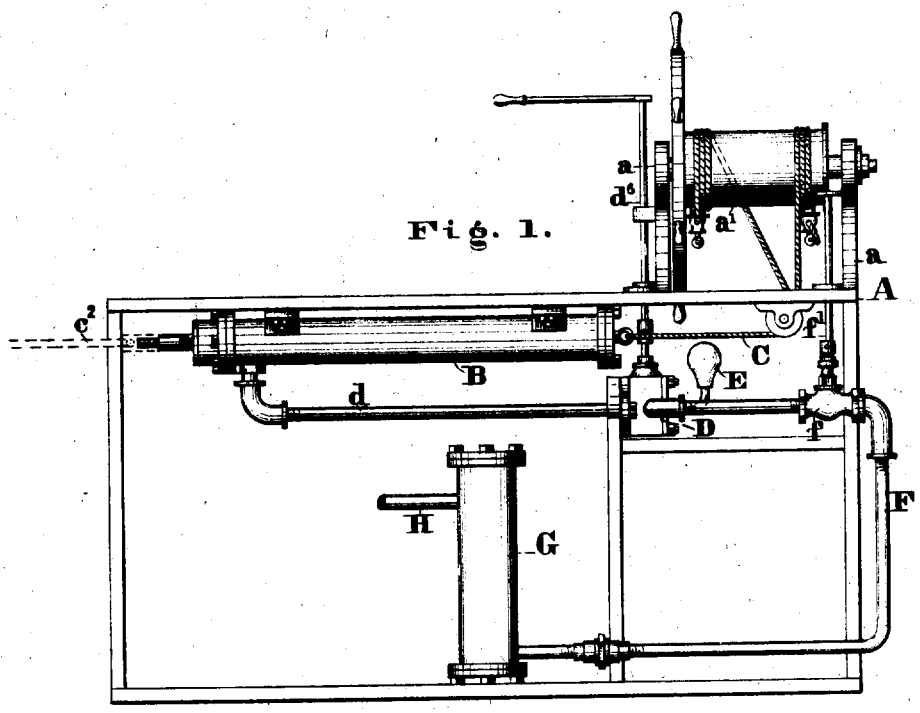
Figure 2:
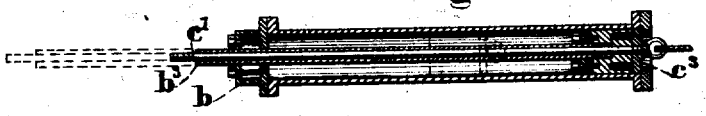
Figure 3:
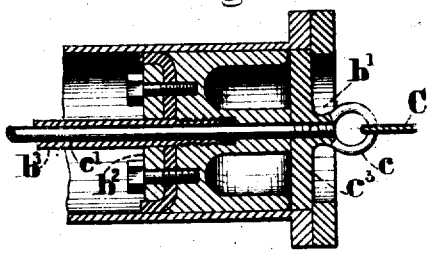
Figure 4:
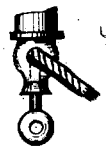
Figure 5:
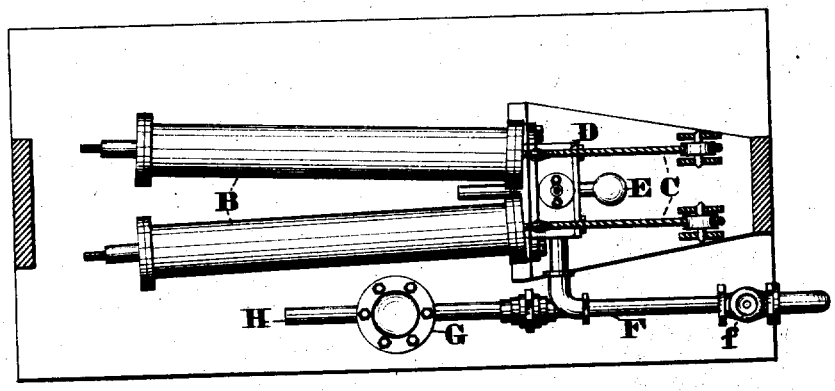
Figure 10:
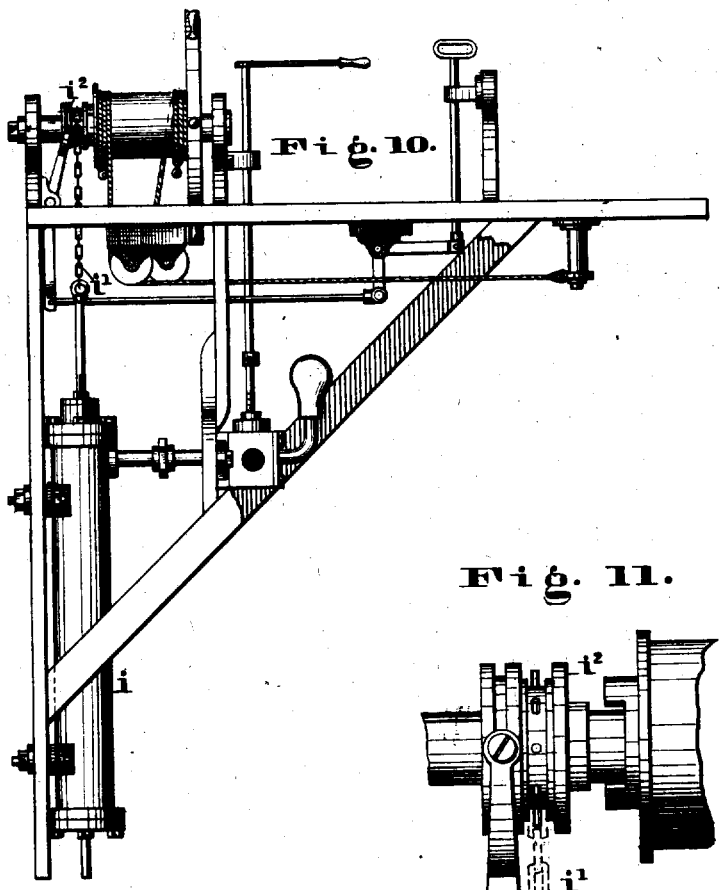
Figure 11:
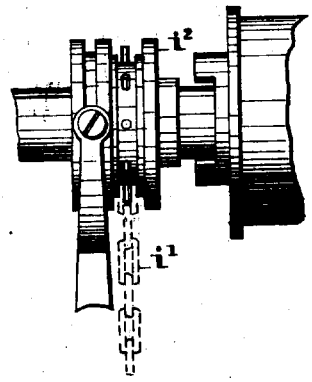

In the drawings, Figure 1 represents a side elevation of one method of employing my improved apparatus; Fig. 2, a longitudinal sectional elevation of one of the hydraulic cylinders; Fig. 3, an enlarged view of one end of the same; Fig. 4, an enlarged view of the metal piece by means of which the ends of the tiller-ropes are secured to the steering-wheel; Fig. 5, a plan view of the hydraulic cylinders and the system of pipes; Figs. 6, 7, 8, and 9, various views of the valve mechanism; Fig. 10, a side elevation of another method of employing my improved apparatus; Fig. 11, an enlarged view of the clutch mechanism of the steering-wheel; Fig. 12, a side elevation of a double-acting cylinder, and Figs. 13 and 14 modified views of the valve mechanism.

To enable others skilled in the art to make and use my invention, I will now proceed to describe fully its construction and manner of operation.

A, Fig. 1, represents the deck of a steamer, upon which are located the usual standards *a a*, or other equivalent means for properly supporting the axis or shaft of the usual steering-wheel *a'*.

B B, Figs. 1 and 5, represent cylinders located at any proper point, but essentially on the same line as that in which move the tiller-ropes, which equal in length the extreme distance moved by the tiller, and are provided at one end with a stuffing-box, *b*, Fig. 2, and at the other with an opening, *b'*, Fig. 3, as shown.

$b^2$, Fig. 3, represents a piston adapted to move in the cylinder in the usual manner, which has a central opening, as shown. $b^3$, Fig. 2, represents a hollow piston-rod attached thereto, the free end of which projects outward from the cylinder through the stuffing-box, as shown.

C C, Figs. 1 and 5, represent the tiller-ropes, each of which is attached at one end to the drum of the steering-wheel in the usual well-known or any other proper manner, and, after passing over proper pulleys, is attached at the other end to the eye *c* of the disk $c^3$, Fig. 3, of the tiller-rod or chain *c'*, lying in the hollow piston-rod, as shown.

$c^2$, Fig. 1, represents an extension of the rod, either rope or chain, the rear end of which is attached to the rudder in any proper manner.

D, Figs. 1 and 5, represents a valve chest or chamber located at any proper point, but essentially upon a lower plane than the cylinder, in order that the contents of the latter, when not under pressure, may flow to the former by the force of gravity, and preferably, for convenience, in line below the pilot-house.

Figure 6:
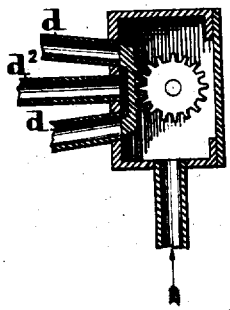
Figure 7:
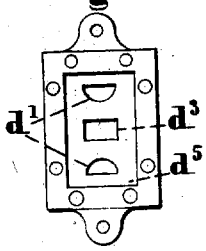

*d d*, Figs. 1 and 6, represent pipes, connected at one end to the cylinder in such manner as to open thereinto between the closed end and the piston, and at the other to the valve-chest, in such manner as to connect with the inlet-ports *d' d'*, Fig. 7, as shown.

$d^2$, Fig. 6, represents a pipe connecting with the exhaust-port $d^3$, Fig. 7, which is extended away to any proper point of discharge.

Figure 8:
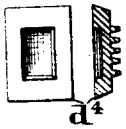

$d^4$, Fig. 8, represents the valve; $d^5$, Fig. 7, the valve-seat, having the inlet-ports *d'* and the exhaust $d^3$, as shown. This valve, it will be observed, is like the ordinary D slide-valve; but the inlet-port is made round upon the side next the exhaust and square upon the opposite side, as shown in Fig. 7, in consequence of which it follows that when the valve is moved to admit water upon one side a square opening will be exposed for a passage of the same, while on the opposite side a round opening of less area will be exposed to permit the exhaust.

Figure 9:
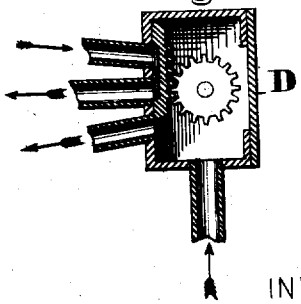

$d^6$, Fig. 1, represents a shaft passing through a stuffing-box in the valve-chamber, which is provided below with a pinion, as shown in Figs. 6 and 9, or other suitable device for actuating the slide-valve, and above with a lever or other handle, for convenient manipulation.

E, Figs. 1 and 5, represents an air-chamber, which is attached to the valve-chamber for the same purpose for which it is employed in other places.

F, Figs. 1 and 5, represents a pipe connected at one end to the valve-chamber D and at the other to the reservoir G near its upper end, as shown.

*f* represents a throttle-valve, and *f'*, Fig. 1, an actuating rod or shaft extending into the pilot-house, by means of which the supply of water into the valve-chamber can be cut off whenever it is desired to stop the action of the hydraulic apparatus.

H, Figs. 1 and 5, represents a pipe leading into the top of the reservoir G, which connects at its other end with the feed-pipe near the feed-pump, which supplies the boiler with water.

The operation is substantially as follows: The feed-pump being in operation, a supply of water will be delivered to the reservoir and to the system of pipes leading therefrom.

When it is desired to use the apparatus the pilot simply turns the lever of shaft $d^6$ in the proper direction. By this means water is admitted from the valve-chest D, through the pipe *d*, to one of the cylinders B. By the pressure of the entering water the piston of this cylinder is driven forward, and consequently the plate $c^3$, provided with the eye *c*, with which it is in contact. The extension $c^3$ is thus drawn forward, and the rudder attached thereto turned to one side.

By the movement of the rudder the rope upon the other side is caused to move in the opposite direction in the usual well-known manner.

When it is desired to steer in the opposite direction the lever-handle is so turned as to admit water from the valve-chest into the other pipe *d*, in consequence of which its piston will be drawn forward to actuate the tiller-rope, while the first piston will be consequently drawn backward, the water contained in its cylinder flowing out through the exhaust.

When it is desired to hold the rudder in any desired position the lever-handle is turned into a central position, by which means the ports are closed, the valve having a half-inch lap, and the columns of water contained in the cylinders locked therein. The pistons may be, of course, in different positions in the cylinders relatively to each other, and the water-columns consequently be of different lengths; but, nevertheless, the rudder will be rigidly held, because no movement of the non-elastic columns can take place until the ports are again opened.

The port, which for the time being serves as an inlet-port, is opened upon the side which is straight, while the corresponding port, which serves as an exhaust, is opened upon the side which is curved, from which it follows that a larger area is furnished for the inflowing stream than for the outflowing. By means of this construction of parts the rudder is always rigidly held in any desired position under ordinary circumstances.

When moving in either direction it is, of course, rigidly held, because the piston attached thereto is positively acted upon by a moving column of water, which drives it in one direction against the resistance of another column flowing through a contracted orifice.

When the position of the valve is suddenly changed the rudder is still rigidly held, because the pressure on each side is still retained, but the excess thereof is transferred from one side to the other. If, however, it should happen by chance at any time that the rudder should come in contact with an immovable obstacle and pressure be exerted thereon exceeding that of the pressure in the boiler, the rudder would then move the pistons and force the water or steam back through the valve-chest (the valve $d^4$, if covering the openings, being lifted from its seat) into the reservoir, or even into the boiler itself. By this means of relief the breakage of any part is prevented under such circumstances.

The cylinders, it will be observed, are single-acting, a positive action being exerted only when the piston is moving in a forward direction, the return movement of each being effected by the forward movement of its fellow, the rods being united by the tiller-ropes, as described.

In order that the apparatus may continue to work, even if the feed-pump is stopped for a short period, a hole of proper size may be placed in the check-valve at the boiler, by which means steam or water will be admitted to the reservoir to create the proper pressure. If desired, a larger connection might be made to the lower part of the boiler.

If desired, the piston may be acted upon directly by the steam; but water is preferred, because it is less elastic and does not condense.

When the hydraulic apparatus is in use the position of the rudder will be indicated by the steering-wheel, which then serves as an index.

When it is desired to steer by hand the throttle-valve is employed to cut off the flow of water. The slide-valve then being properly operated first in one direction and then in the other, the water contained in the cylinders will flow therefrom by the force of gravity, and permit the pistons to move backward to the rear end of the cylinders, in which position they will remain until the water is again admitted.

The tiller-ropes, when the wheel is operated by hand, render freely through the hollow piston-rods and operate the rudder in the usual well-known manner.

The change from hand to power steering, it will be understood, may be readily made at any time, when desired, without the change of any part, the piston in one case being employed to actuate the rudder, and the wheel in the other case.

The hollow pistons and piston-rods serve a double purpose: first, by means of this construction an instantaneous change may be made from steering with the power of water under the pressure of the boiler to steering with the wheel by hand in the usual manner; and, second, by means of this construction the water is permitted to run out of the cylinders, which draws the pistons back to the after end of the same and forces out therefrom the rods, in consequence of which the cylinders are not liable to injury from rust or frost, and the rods are permitted to dry.

By means of the special construction, also, the use of cocks and valves in the pipes is dispensed with, the throttle-valve and slide being alone employed to obtain the desired results.

A modification of the foregoing is shown in Figs. 10 and 11. In this two single-acting cylinders, I, Fig. 10, are employed with a similar system of pipes and valves; but the cylinders are located away from the line of the tiller-ropes, as shown. These pistons are connected to the steering-wheel by means of a chain, $i'$, Figs. 10 and 11, and pulley $i^2$, the latter being connected to the steering-wheel by means of any proper clutch device having a proper shifting-lever, as shown.

The tiller-ropes are connected to the wheel and tiller in the usual manner.

The operation is substantially as follows: The wheel may be used in the ordinary way by simply throwing the pulley $i^2$ out of gear, as shown in Fig. 11. When it is desired to use the hydraulic apparatus the pulley is thrown in gear and the valve-lever used in the manner previously described. The pistons will then be actuated as before described, and give proper movement, by means of the intermediate chain, $i'$, to the steering-wheel, which latter will communicate the same to tiller-ropes in the usual manner.

Another modification is shown in Fig. 12. This is substantially like the modification just described, with the exception that one double-acting cylinder is employed in the place of two single-acting cylinders. The arrangement of the supply-pipes must be modified, of course, for this cylinder in the manner well understood.

A modified form of valve is shown in Figs. 13 and 14. J, Fig. 13, represents a shaft, which is connected at the proper point to the valve $j$ by means of shoulders $j'$. $j^2$ represents a threaded bearing, through which passes the threaded ends of the shaft, as shown.

The operation is substantially as follows: When the shaft is revolved it is necessarily caused to move in a longitudinal direction in the threaded bearing, and to carry with it the valve attached thereto.

By means of this construction the valve may be adjusted with great nicety and be securely held in any position in which it may be placed.

Having thus fully described my invention, what I claim as new, and desire to secure by Letters Patent, is—

1. In combination with the cylinder and the tiller-connection rendering through the same, a piston loose upon said connection, the construction being such that the connection may be used, if desired, without moving the piston, substantially as described.

2. In combination with the cylinder, the tiller-rod $c'$, provided with disk $c^3$ and adapted to render through the cylinder, and the piston $b^2$, having the hollow piston-rod $b^3$, as described.

This specification signed and witnessed this 18th day of November, 1879.

JOHN GATES.

Witnesses:
E. W. CORNELL,
H. W. FAIRWEATHER.